Dec. 4, 1962 H. STEINMETZ ET AL 3,066,642
INDICATING ARRANGEMENT FOR CAMERAS AND THE LIKE
Filed Feb. 16, 1960 2 Sheets-Sheet 2
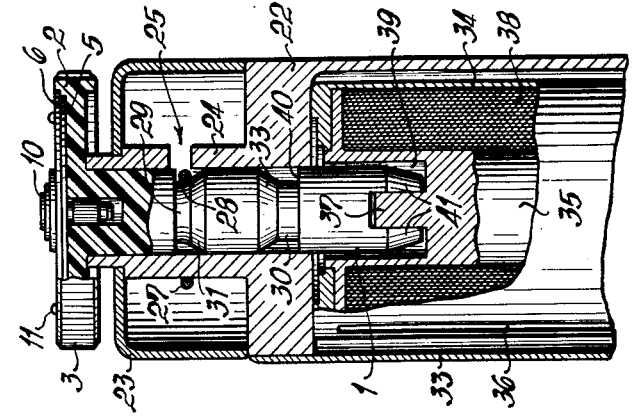
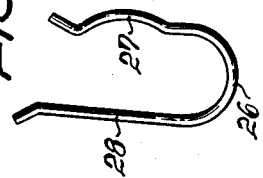
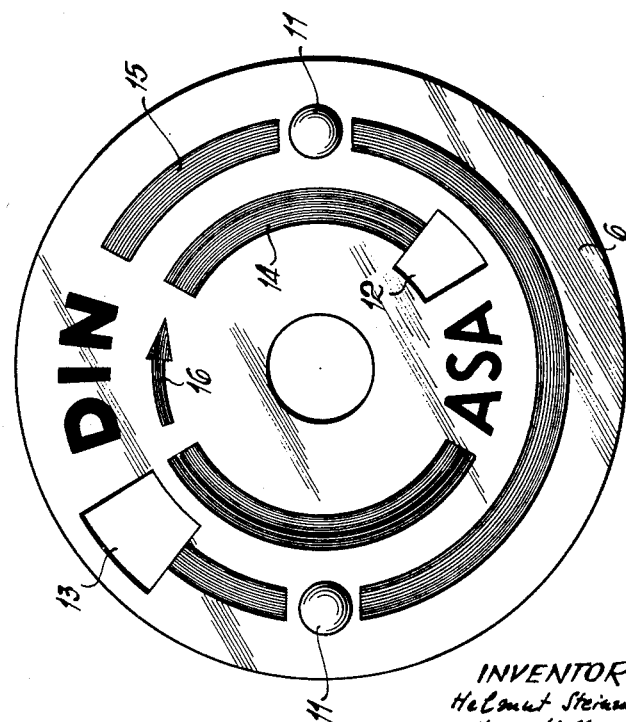
INVENTORS:
Helmut Steinmetz
Hans Hell
Hans-Hermann Koeppe
by:
Michael S. Striker

United States Patent Office 3,066,642
Patented Dec. 4, 1962

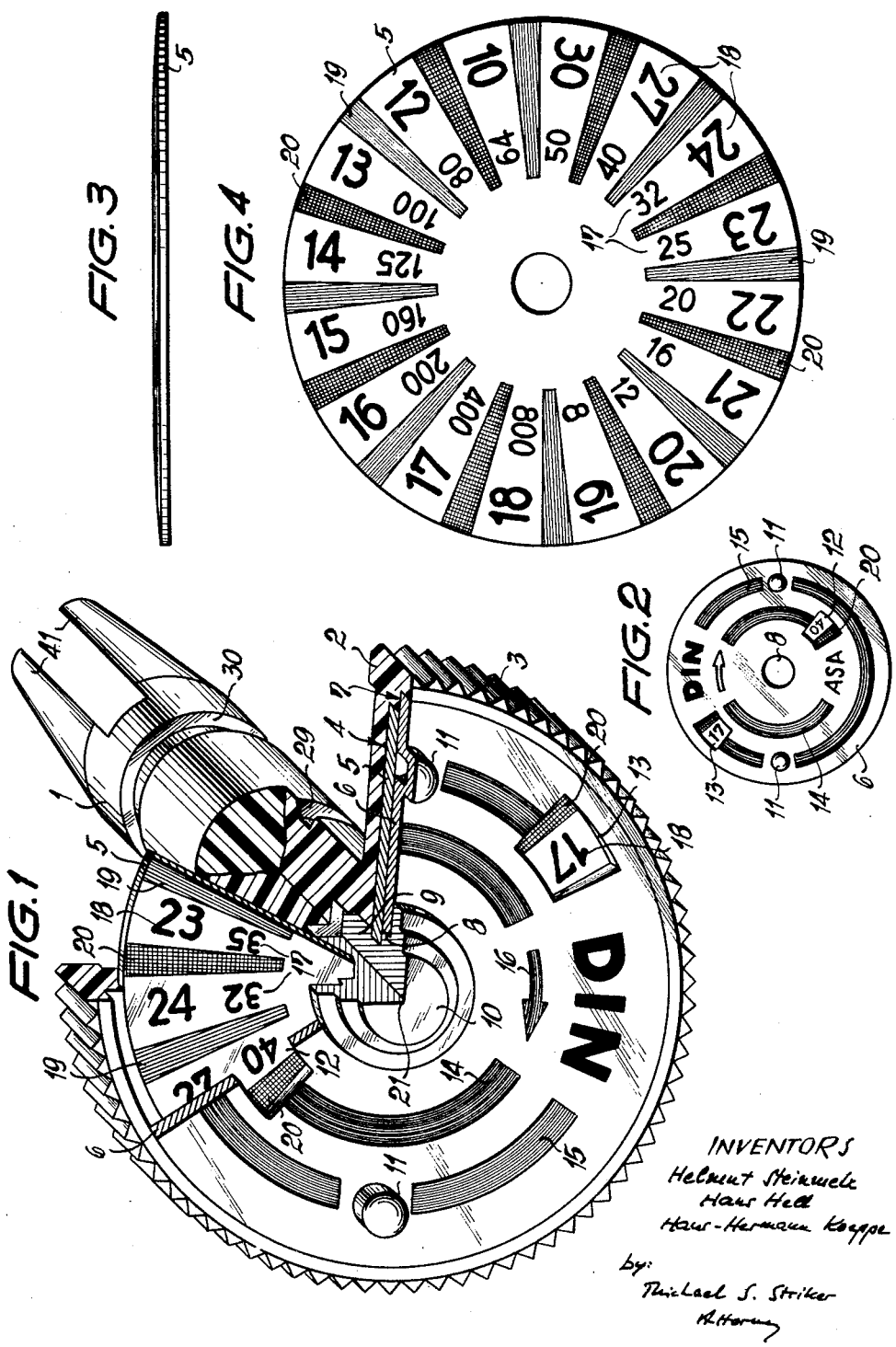

3,066,642
INDICATING ARRANGEMENT FOR CAMERAS
AND THE LIKE
Helmut Steinmetz, Wiesbaden, Hans Hell, Wiesbaden,
Freudenberg, and Hans-Hermann Koeppe, Wiesbaden,
Germany, assignors to Adox-Fotowerke Dr. C. Schleussner G.m.b.H. Kamerawerk, Wiesbaden-Biebrich, Germany
Filed Feb. 16, 1960, Ser. No. 9,034
Claims priority, application Germany Feb. 17, 1959
3 Claims. (Cl. 116—114)

The present invention relates to devices which are required to carry indicia indicating characteristics of the device or of materials used with the device.

More particularly, the present invention relates to cameras and to structure for reminding the operator of information such as the particular film speed of the film which is in the camera and such information as, for example, whether or not the film is black-and-white or color film.

At the present time there are two widely used systems of film speeds, namely, the American ASA system and the German DIN system, and also there are different characteristics of film aside from their exposure indexes such as whether the film is black-and-white or color film, and in order to provide on a device such as a camera a means which will remind the used of the particular characteristics of the film which happens to be in the camera exceedingly complex structures requiring an undesirably large amount of space are now used, or there simply is no adequate device capable of reminding the user of the type of film which is in the camera.

It is therefore a primary object of the present invention to provide a device such as a camera with a structure which will include in a minimum amount of space all of the information necessary to remind the operator of all of the characteristics of the film which is used with the camera.

Another object of the present invention is to provide a device such as a camera with an arrangement according to which all of this information can be indicated at a part of the camera which must be available in any event and which is advantageously used for this purpose so that it is not necessary with the arrangement of the invention to occupy valuable space necessary for other purposes.

A further object of the invention is to provide for a device such as a camera a structure which can be easily and quickly manipulated by the operator so as to be set to indicate the desired information.

It is also an object of the present invention to provide a structure capable of accomplishing all of the above objects and at the same time composed of single rugged elements which are very reliable in operation and which can be very easily and quickly assembled into an extremely compact assembly.

With the above objects in view the present invention includes in a camera or the like an indicia disc carrying on one of its faces a first circular row of indicia indicating film speeds according to the ASA system and a second concentric circular row of indicia indicating film speeds according to the DIN system, the indicia carrying face of the indicia disc being covered by a window disc which is coaxial with the indicia disc and which is formed with windows respectively aligned with the two rows of indicia so that indicia from the latter rows will appear through the windows. A means is provided for connecting one of the discs to the other of the discs for rotation with respect to the latter about their common axis so that it becomes possible to align one of the indicium of a selected row with the window through which this row is visible, and thus in the case of film, for example, there is a constant reminder of the exposure index of the film which happens to be in the camera.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 shows in a partly sectional perspective view of the invention as applied to the rewind knob of a still camera;

FIG. 2 is a view, on a reduced scale as compared to FIG. 1, showing how the window disc appears from the outside;

FIG. 3 is an edge view of the indicia disc;

FIG. 4 is a top plan view of the indicia disc of FIG. 3;

FIG. 5 is an edge view of the window disc;

FIG. 6 is a top plan view of the window disc of FIG. 5;

FIG. 7 illustrates a wire spring; and

FIG. 8 is a fragmentary transverse sectional view, on a reduced scale as compared to FIG. 1, through the front and rear walls of a camera which includes the film rewind knob of FIG. 1, FIG. 8 showing how this knob cooperates with the remaining associated camera structure.

Referring now to FIGS. 1 and 8, it will be seen that the film rewind knob 2 has a shank 1 coaxially fixed to and extending therefrom, the knob 2 and the shank 1 being integral and made of any suitable plastic, for example. The outer periphery of the knob 2 is knurled as indicated at 3 in FIG. 1 so as to facilitate grasping of the knob 2 by the operator.

The knob 2 is formed with a recess 4, and an indicia disc 5 is located within this recess and is fixed to the knob 2 in a manner described below. A window disc 6 is located over the indicia disc 5, and the knob 2 is provided with a shoulder 7 (FIG. 1) coaxial with the recess 4 and receiving the outer periphery of the window disc 6. A pin 9 extends coaxially through a central opening 8 of the window disc 6 as well as through a central opening of the indicia disc 5, and the shank of this pin 9 has a press fit with the knob 2 so that the pin 9 is fixed in this way to the knob 2, and the pin 9 has an enlarged end 10 beneath which the window disc 6 extends so that the pin 9 serves to guide the disc 6 for turning movement around the common axis of the discs 5 and 6 while preventing axial movement of the disc 6 away from the assembly. In order to facilitate turning of the disc 6, it is provided with a pair of relatively small projections 11 shown in FIG. 1. Thus, the operator need only hold the knob 2 stationary and push on one or both of the projections 11 so as to turn the disc 6 with respect to the disc 5 which is fixed to and remains stationary with the knob 2.

The window disc 6 is formed with a window 12 and with an opposed window 13 located at a greater radial distance from the center of the disc 6 than the window 12. An inner series of circular segments 14 are located along an inner circle at the same radial distance as the window 12, and an arrow 16 is located between a pair of the segments 14 to indicate the proper direction of turning of the knob 2 for rewinding purposes, and also the legend ASA is located between the pair of segments 14, as is evident from FIGS. 2 and 6. The exterior face of the disc 6 is also provided with a second series of segments 15 located along a second circle of the same radius as the radial distance of the window 13 from the center of the disc 6 and between the segments of the circle along which the segments 15 are located are placed the projections 11 as well as the legend DIN. These segments 14 and 15 as well as the legends and the arrow 16 may be formed according to the Eloxal process so that a very glossy smooth appearance is provided.

On the outer face of the indicia disc 5 is located an inner or first circular row of indicia 17 at the same radial distance from the common axis of the discs as the segments 14 and the window 12, and the series of indicia 17 indicate various film speeds according to the ASA system. Also, the indicia disc 5 carries at its outer face a second, outer circular row of indicia 18 indicating film speeds according to the DIN system, and as may be seen particularly from FIG. 4, the ASA film speeds are displaced through 180° with respect to the corresponding DIN film speeds. Since the windows 12 and 13 are also displaced with respect to each other by 180°, the identical film speeds according to the ASA and the DIN systems will simultaneously appear in the windows 12 and 13, As is particularly apparent from FIG. 4, the series of indicia of the pair of rows 17 and 18 are separated by substantially sector-shaped areas 19 and 20, the areas 19 being of one color and alternating with the areas 20 which are of a different color. The areas 19 are black and are indicative of black-and-white film, while the areas 20 are red and are indicative of color film. The circumferential width of the window 12 is such that there will appear through this window one of the indicia of the row 17 plus part of one of the areas 19 or 20, while the circumferential width of the window 13 is such that one of the indicia of the row 18 plus one of the areas 19 or 20 will appear through this window. Thus, referring to FIG. 2, it will be seen that the ASA film speed 40 and the corresponding DIN film speed 17 appear simultaneously through the windows 12 and 13, respectively, while at the same time parts of a pair of areas 19 are visible through these windows so as to indicate that black-and-white film with an exposure index of 40 according to the ASA system and 17 according to the DIN system is located in the camera. If color film with the same film speed were located in the camera, then it would only be necessary to turn the window disc 6 slightly in a counterclockwise direction, as viewed in FIG. 2, so as to retain the same numerals in the windows but so as to cover the black areas 19 and show the read areas 20 in the windows. In this way it is possible with the structure of the invention to locate any desired set of indicia in the windows.

It will be noted that the entire structure is located on the film rewind knob 2 which is required in any event, so that there is no extra space required for the structure of the invention and also the structure of the invention does not occupy an indesirably large space somewhere on the camera. Furthermore, since the indicia is located on the rewind knob, it is conveniently visible to the operator at all times.

As may be seen from FIG. 3, the indicia disc 5 which may be made of cardboard, plastic, or the like, is slightly dished, and its outer diameter is very slightly larger than that of the recess 4, so that it must be pressed into this recess 4 and because of its dished configuration will press its outer periphery against the outer edge of the recess 4 so as to fix the disc 5 reliably to the knob 2 in this way. Also, as may be seen from FIG. 5, the window disc 6 is slightly dished, and the outer periphery of this disc bears with a light frictional force against the shoulder 7 at the outer periphery thereof, so that while the disc 6 is easily turned there is nevertheless sufficient friction to maintain the disc 6 in the position to which it has been turned.

Referring to FIGS. 7 and 8, the camera housing 22, which may be made of plastic, is provided with a cylindrical upwardly extending extension 24 which receives the shank 1 of knob 2 so as to serve as a bearing for turnably supporting the knob 2 as well as supporting the shank 1 for axial movement. A cap 23 is located on top of the housing 22 and defines with the latter a space where structure such as a viewfinder is located. The cylindrical extension 24 is formed with a slot 25, and a wire spring 26 (FIG. 7) has a pair of legs 27 and 28, the leg 28 extending through the slot 25 perpendicularly to the axis of the shank 1, and the arm 27 extends part way around the exterior surface of the cylindrical extension 24 and serves to maintain the spring 26 in the position illustrated in FIG. 8, the leg 28 extending in the slot 25 to maintain the spring in this position also.

The shank 1 of the knob 2 is formed with a groove 29 into which the leg 28 of the spring 26 extends in the position of the knob 2 illustrated in FIG. 8, and this groove 29 has a lower frustoconical surface 31. Below the groove 29 the shank 1 is formed with a groove 30 which has an upper frustoconical surface 32 and a lower surface 40 located in a plane normal to the axis of the shank 1. In the position of the knob 2 shown in FIG. 8 the lower part of the shank 1 extends into a bore 39 formed coaxially in the upper end portion of the core 35 of the film spool 38 which is located within the casing 34, the film issuing through the light-tight slot 36 in a well known manner to be exposed. The bottom end of the shank 1 is bifurcated at 41 and receives the projection 37 of the core 35 so that after the film 38 is exposed it can be rewound into the casing 34 upon turning of the knob 2 in the direction of the arrow 16 with the knob 2 in the position shown in FIG. 8. FIG. 8 shows the rear wall 33 of the camera housing 22, this rear wall 33 being in the form of a door capable of being swung to an open position to permit the spool 38 to be removed and also being closed in a light-tight manner to enable proper exposure to take place. Of course, when a spool is removed or inserted the knob 2 is pulled up, as viewed in FIG. 8, to a position which locates the leg 28 of the spring 26 in the groove 30, and because the surface 40 is in a plane normal to the axis of the shank 1 this surface 40 cooperates with the leg 28 to limit the outward movement of the shank 1. If it is desired to remove the shank 1 then the ends of the spring 26 must be spread apart from each other.

It will be noted that with the structure of the invention the only space required for the indicating arrangement is the exterior area of the knob 2, so that valuable space elsewhere on the camera is not occupied by the indicating structure of the invention, and at the same time the indicating structure while located in a relatively small space provides in a highly efficient manner all of the necessary information with respect to the film which is used in the camera.

It will be understood that each of the elements described above, or two or more together, may also find a useful application in other types of indicating apparatus differing from the types described above.

While the invention has been illustrated and described as embodied in adjustable indicating apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefor, such adaptations should and are intended to be comprehended within the meaning and range of equivalence of the following claims.

What is claimed as new and desired to be secured by Letters Patent is:

1. For use in a camera or the like, in combination, an indicia disc carrying on one face thereof a first circular row of indicia indicating film speeds according to the ASA system and a second circular row of indicia concentric with said first row and indicating film speeds according to the DIN system; a window disc covering said face of said indicia disc coaxially with the latter and being formed with a pair of windows respectively located at radial distances from the common axis of said discs equal to the radii of said circular rows, so that the indicia of one row will be visible through one window while the indicia of the other row will be visible to the other window; and means supporting one of said discs for rotary movement about the common axis of said discs with respect to the other of said discs so that the windows can be respectively aligned with desired indicia of said rows, said indicia disc carrying between the several indicia of the two rows substantially sector-shaped areas of alternating colors respectively indicating black-and-white film and color film and said windows each having a circumferential width large enough to include at least part of one of the colored areas plus an indicium.

2. In a camera, in combination, a film rewinding knob formed with a recess and with a shoulder surrounding said recess coaxially therewith; an indicia disc in said recess having a peripheral portion frictionally pressing against the edge of said recess for fixing said disc to said knob, said indicia disc having an exterior surface carrying an inner circular row of film speed indicia according to the ASA system and an outer concentric circular row of film speed indicia according to the DIN system and said disc carrying between the indicia of the rows substantially sector-shaped areas of alternating black and red colors respectively indicating black-and-white film and color film; a window disc covering said indicia disc and having a periphery frictionally engaging the shoulder of said knob, said window disc being formed with one window at the radial distance from the common axis of said discs of said inner row of indicia and with a second window at the radial distance from said axis of said outer row of indicia so that the pair of rows will have their indicia simultaneously visible through said windows, each window having a circumferential width equal to one of the indicia of said rows plus at least part of one of the sectors so that the operator can see through the windows not only the particular film speed but also whether the film is black-and-white or color film; means connecting said window disc to said knob for rotation with respect to the latter so that the windows can be aligned with selected indicia; at least one projection fixed to and projecting from an exterior surface of said window disc to facilitate the manual turning thereof by the operator; an inner series of circular segments of the same radius as said inner row of indicia located on said exterior surface of said window disc and the latter carrying between a pair of said segments the legend ASA and said disc also carrying at its exterior surface a second series of segments of a circle of the same radius as the outer row of indicia and the legend DIN being located between a pair of the latter segments.

3. In a camera, in combination, a film rewinding knob formed with a recess and with a shoulder surrounding said recess coaxially therewith; an indicia disc in said recess having a peripheral portion frictionally pressing against the edge of said recess for fixing said disc to said knob, said indicia disc having an exterior surface carrying an inner circular row of film speed indicia according to the ASA system and an outer concentric circular row of film speed indicia according to the DIN system and said disc carrying between the indicia of the rows substantially sector-shaped areas of alternating black and red colors respectively indicating black-and-white film and color film; a window disc covering said indicia disc and having a periphery frictionally engaging the shoulder of said knob, said window disc being formed with one window at the radial distance from the common axis of said discs of said inner row of indicia and with a second window at the radial distance from said axis of said outer row of indicia so that the pair of rows will have their indicia simultaneously visible through said windows, each window having a circumferential width equal to one of the indicia of said rows plus at least part of one of the sectors so that the operator can see through the windows not only the particular film speed but also whether the film is black-and-white or color film; means connecting said window disc to said knob for rotation with respect to the latter so that the windows can be aligned with selected indicia; at least one projection fixed to and projecting from an exterior surface of said window disc to facilitate the manual turning thereof by the operator; an inner series of circular segments of the same radius as said inner row of indicia located on said exterior surface of said window disc and the latter carrying between a pair of said segments the legend ASA and said disc also carrying at its exterior surface a second series of segments of a circle of the same radius as the outer row of indicia and the legend DIN being located between a pair of the latter segments, and said window disc also carrying at its exterior surface an arrow indicating the proper direction of turning of the knob for rewinding.

References Cited in the file of this patent

UNITED STATES PATENTS

| | | |
|---|---|---|
| 2,245,214 | Mihayli | June 10, 1941 |
| 2,714,844 | Herdecke | Aug. 9, 1955 |
| 2,765,763 | Bretthauer | Oct. 9, 1956 |
| 2,773,437 | Knauf | Dec. 11, 1956 |
| 2,789,528 | Kaden | Apr. 23, 1957 |